(12) United States Patent
Chang et al.

(10) Patent No.: US 7,477,799 B2
(45) Date of Patent: Jan. 13, 2009

(54) IMAGE SHIFTING MODULE AND OPTICAL PROJECTION DEVICE

(75) Inventors: Wei-Sheng Chang, Hsinchu (TW); Yuan-Yu Lee, Hsinchu (TW); Tai-Ling Chung, Hsinchu (TW); Wei-Szu Lin, Hsinchu (TW); Chi-Chui Yun, Hsinchu (TW); Wan Chiang Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 708 days.

(21) Appl. No.: 11/162,086

(22) Filed: Aug. 29, 2005

(65) Prior Publication Data

US 2006/0140511 A1    Jun. 29, 2006

(30) Foreign Application Priority Data

Nov. 12, 2004    (TW) .............................. 93134611 A

(51) Int. Cl.
*G06K 9/20*    (2006.01)
(52) U.S. Cl. .................. 382/293; 382/291; 382/317
(58) Field of Classification Search .................. 382/291, 382/293, 295, 307, 317
See application file for complete search history.

(56) References Cited

U.S. PATENT DOCUMENTS

| | | | | |
|---|---|---|---|---|
| 6,236,431 B1 * | 5/2001 | Hirasawa et al. | ....... | 348/240.99 |
| 6,581,007 B2 * | 6/2003 | Hasegawa et al. | ............ | 701/301 |
| 6,828,540 B2 * | 12/2004 | Landolt | .................. | 250/208.1 |
| 6,850,280 B2 * | 2/2005 | Hirasawa et al. | ............ | 348/350 |
| 7,339,612 B1 * | 3/2008 | Yajima | .................... | 348/208.7 |

* cited by examiner

*Primary Examiner*—Yosef Kassa
(74) *Attorney, Agent, or Firm*—Jianq Chyun IP Office

(57) ABSTRACT

An image shifting module for shifting imaging positions of sub-images projected on a screen in each frame, and an optical projection device using the same are provided. The image shifting module includes a first vibration mechanism and a second vibration mechanism. The first vibration mechanism is disposed on the transmission path of the sub-images and shifts the sub-images projected on the screen by a first distance along a horizontal direction in each frame time. Moreover, the second vibration mechanism is disposed on the transmission path of the sub-images and shifts the sub-images projected on the screen by a second distance along a vertical direction in each frame time. Through this image shifting module, the image resolution can be increased.

20 Claims, 6 Drawing Sheets

IMAGE SHIFTING MODULE AND OPTICAL PROJECTION DEVICE

CROSS-REFERENCE TO RELATED APPLICATION

This application claims the priority benefit of Taiwan application serial no. 93134611, filed on Nov. 12, 2004. All disclosure of the Taiwan application is incorporated herein by reference.

BACKGROUND OF THE INVENTION

1. Field of the Invention

The present invention relates to an image shifting module. More particularly, the present invention relates to an image shifting module for increasing image resolution.

2. Description of Related Art

Conventionally, a rear projection display device generates images by an optical engine, and projects the image on a screen. To enhance the resolution of the image projected on the screen, the display components employed in the optical engine should have higher resolution. However, since the display components having higher resolution are costly, a vibration mechanism is used to increase the image resolution in the conventional technology.

FIG. 1 is a schematic view of a structure of a conventional optical projection device. Referring to FIG. 1, the conventional optical projection device 100 includes an illumination system 110, a DMD 120, a projection lens 130 and a vibration mechanism 140. The illumination system 110 has a light source 112 for providing a light beam 114. The DMD 120 is disposed on the transmission path of light beam 114. The DMD 120 converts the light beam 114 into a plurality of sub-images 114a in each frame time. In addition, the projection lens 130 is disposed on the transmission path of the sub-images 114a, and the DMD 120 is disposed between the illumination system 110 and the projection lens 130. Moreover, the vibration mechanism 140 is disposed on the transmission path of the sub-images 114a and between the DMD 120 and the projection lens 130.

In the optical projection device 100 described above, the light beam 114 provided by the light source 112 passes through a color wheel 116, a light integration rod 117, a mirror set 118 and a total internal reflection prism (TIR prism) 119 sequentially. Thereafter, the TIR prism 119 reflects the light beam 114 to the DMD 120. At this moment, the DMD 120 converts the light beam 114 into a plurality of sub-images 114a, and the sub-images 114a pass through the TIR prism 119 and the vibration mechanism 140 sequentially. Then, the sub-images 214 are projected on the screen 400 via the projection lens 230.

Accordingly, when the sub-images 114a pass through the vibration mechanism 140, the vibration mechanism 140 changes the transmission path of some of the sub-images 114a at the same frame time. In other words, the sub-images 114a passing through the vibration mechanism 140 in some time of the same frame time are projected on a first position of the screen 400 (not shown). However, the sub-images 114 passing through the vibration mechanism 140 in other time of the same frame time are projected on a second position of the screen 400 (not shown). In general, the interval between the first position and the second position along the horizontal direction (X-axis) or vertical direction (Z-axis) is about ½ pixel. Since the conventional vibration mechanism 140 only shifts the image position of the sub-image 114a along the horizontal or vertical direction by ½ pixel, only the horizontal or vertical resolution may be increased.

SUMMARY OF THE INVENTION

Therefore, the present invention is directed to an image shifting module for shifting the image position of sub-images in horizontal and vertical direction in each frame time to further increase both the horizontal resolution and vertical resolution of the image.

In addition, the present invention is directed to an optical projection device that can project an image having a higher resolution than that of the reflective light valve by using an image shifting module to further reduce the manufacturing cost.

According to the above and other objects, the present invention provides an image shifting module. The image shifting module of a projection device shifts each imaging position of a plurality of sub-images respectively in each frame time. The image shifting module comprises a first vibration mechanism and a second vibration mechanism. The first vibration mechanism is disposed on a transmission path of the sub-images and shifts the imaging position of the sub-images along a horizontal direction by a first distance in each frame time. The second vibration mechanism is also disposed on the transmission path of the sub-images and shifts the image position of the sub-images along a vertical direction by a second distance in each frame time.

The present invention also provides an optical projection device, comprising an illumination system, a reflective light valve, a projection lens and an image shifting module. The illumination system provides a light beam. The reflective light valve is disposed on a transmission path of the light beam, wherein the reflective light valve converts the light beam into a plurality of sub-images in each frame time. The projection lens is disposed on the transmission path of the sub-images, and the reflective light valve is disposed between the illumination system and the projection lens. The image shifting module is disposed on the transmission path of the sub-images and between the reflective light valve and the projection lens, wherein the image shifting module shifts an imaging position of each sub-image in each frame time. The image shifting module comprises a first vibration mechanism and a second vibration mechanism. The first vibration mechanism is disposed on a transmission path of the sub-images, and the first vibration mechanism shifts the imaging position of the sub-images along a horizontal direction by a first distance in each frame time. The second vibration mechanism is disposed on the transmission path of the sub-images, and the second vibration mechanism shifts the image position of the sub-images along a vertical direction by a second distance in each frame time.

Accordingly, in the image shifting module of the present invention, two vibration mechanisms are disposed on the transmission path of the sub-images. Therefore, one of the vibration mechanisms shifts the sub-images by a desired distance along a horizontal direction in each frame time. In addition, the other vibration mechanism shifts the sub-images by a desired distance along a vertical direction in each frame time. Therefore, the image shifting module of the present invention may increase the horizontal and vertical resolution of the image simultaneously.

In addition, in the optical projection device of the present invention, an image shifting module is disposed over the transmission path of the sub-images. Therefore, a vibration mechanism of the image shifting module shifts the sub-images by a desired distance along a horizontal direction in each frame time to increase the column resolution of the image. In addition, another vibration mechanism of the image shifting module shifts the sub-images by a desired distance along a vertical direction in each frame time to increase the row resolution of the image. Therefore, the optical projection device of the present invention may project an image with higher resolution than the resolution of the reflective light valve used in the projection device.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present invention now will be described more fully hereinafter with reference to the accompanying drawings, in which embodiments of the invention are shown.

Figure 1:
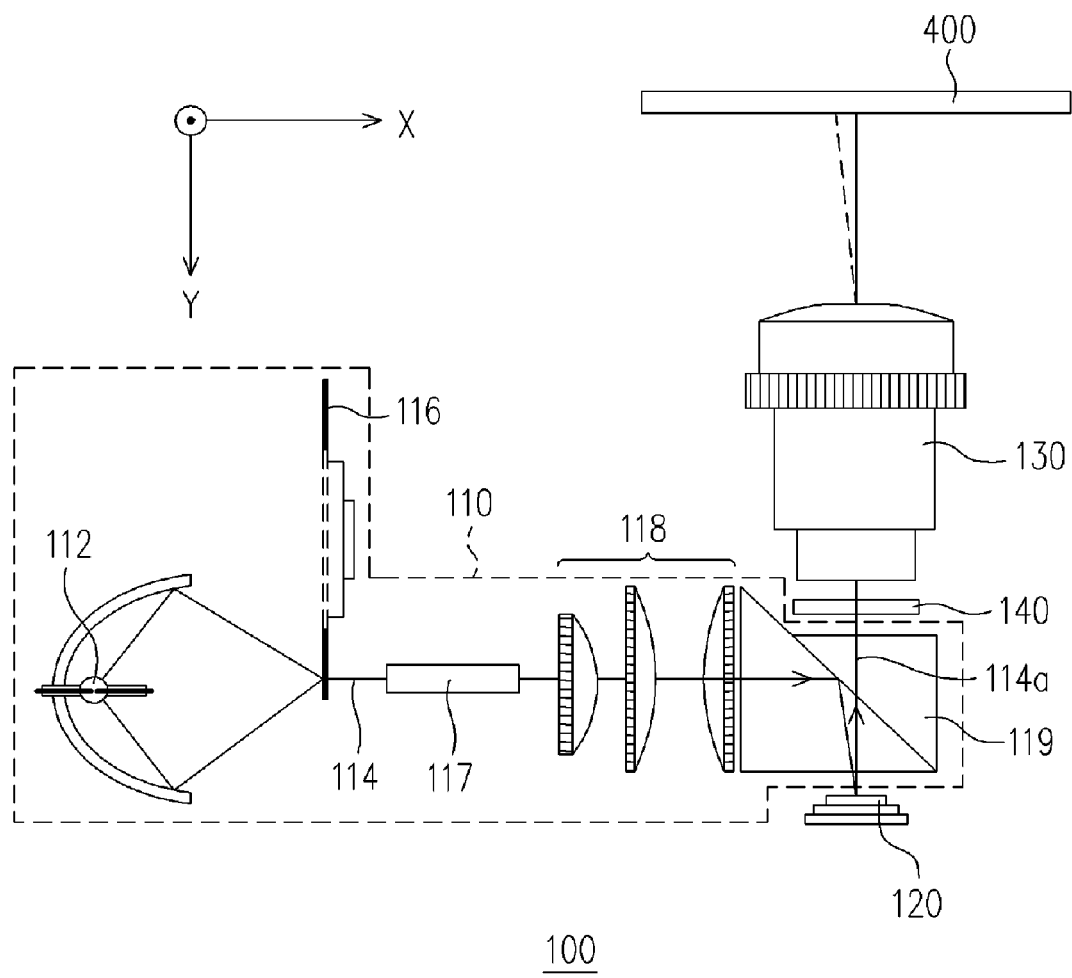
FIG. 1 is a schematic view of a structure of a conventional optical projection device.
Figure 2:
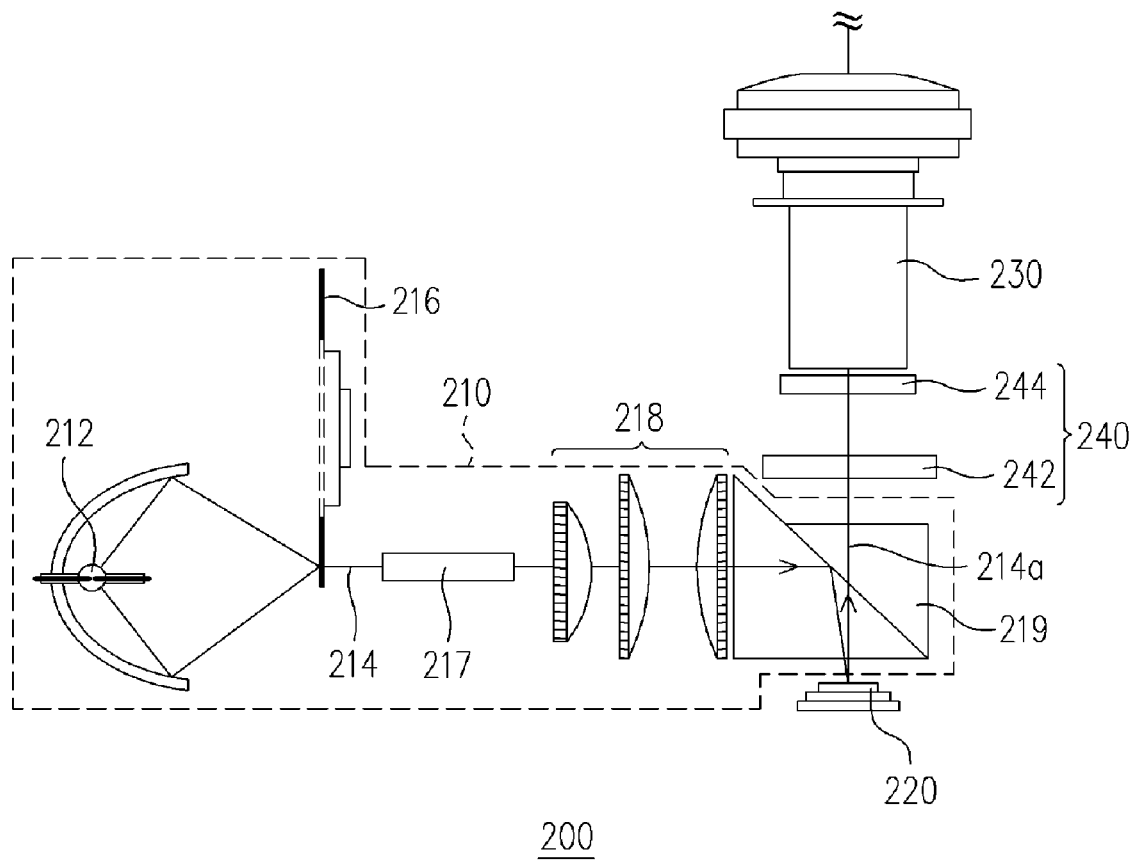
FIG. 2 illustrates a schematic view of a structure of an optical projection device according to one embodiment of the present invention.
Figure 3:
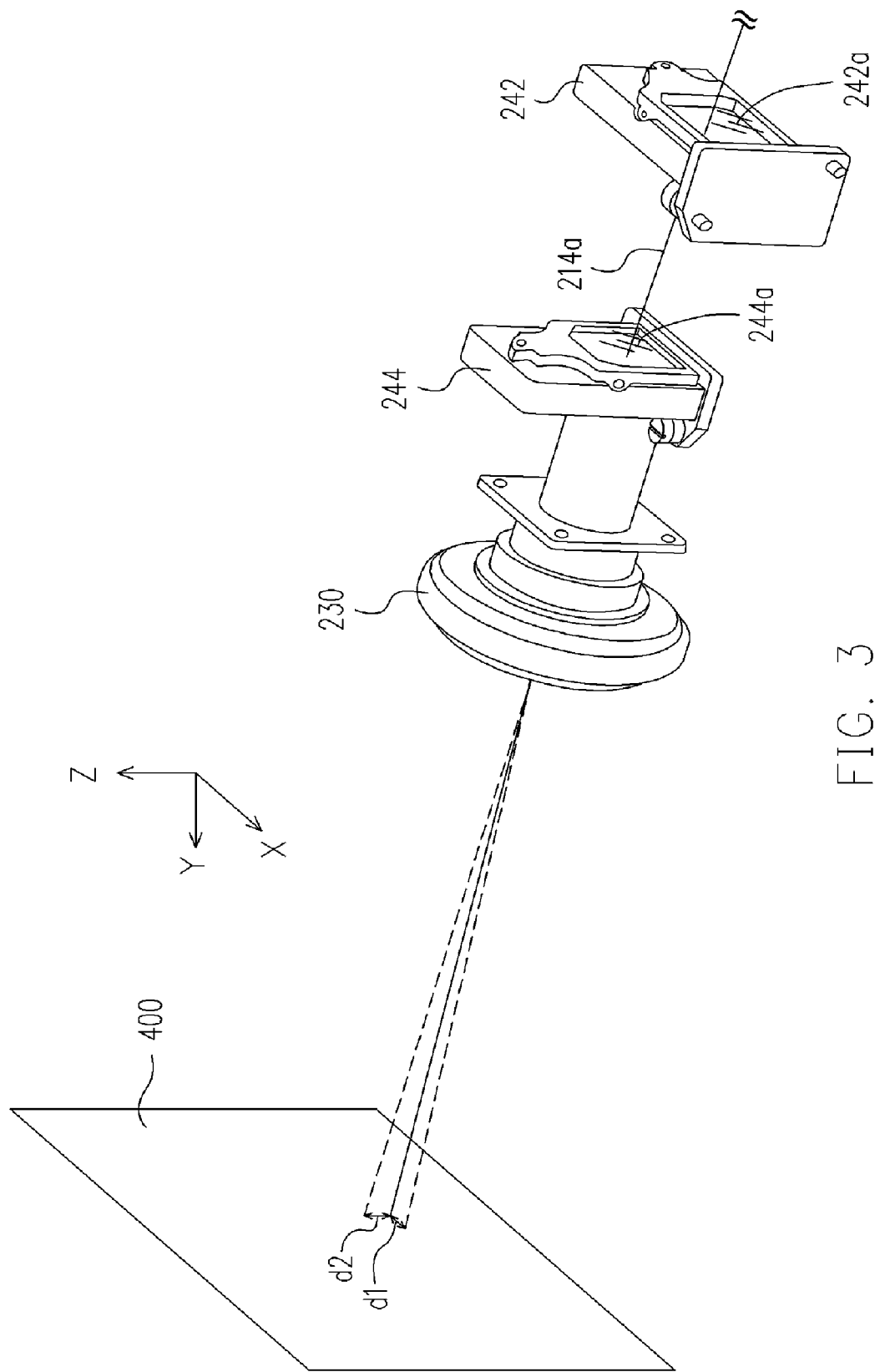
FIG. 3 illustrates a three-dimensional view of a projection lens and an image shifting module according to one embodiment of the present invention.

Referring to FIG. 2 and FIG. 3, an optical projection device 200 comprises an illumination system 210, a reflective light valve 220, a projection lens 230 and an image shifting module 240. The illumination system 210 comprises a light source 212 for providing a light beam 214. The reflective light valve 220 is disposed on the transmission path of the light beam 214. The reflective light valve 220 converts the light beam 214 into a plurality of sub-images in each frame time. In addition, the projection lens 230 is disposed on the transmission path of the sub-images 214a, and the reflective light valve 220 is disposed between the illumination system 210 and the projection lens 230.

In this embodiment of the present invention, the image shifting module 240 is disposed on the transmission path of the sub-images 214a and between the reflective light valve 220 and the projection lens 230. The image shifting module 240 may shifts the imaging position of the sub-images 214a in each frame time. The image shifting module 240 comprises a first vibration mechanism 242 and a second vibration mechanism 244. The first vibration mechanism 242 is disposed on the transmission path of the sub-images 214a and shifts the imaging position of the sub-images 214a along a horizontal direction (X-axis) by a distance d1 in each frame time. The second vibration mechanism 244 is also disposed on the transmission path of the sub-images 214a and shifts the imaging position of the sub-images 214a along a vertical direction (Z-axis) by a distance d2 in each frame time.

The illumination system 210 comprises a telecentric illumination system or a non-telecentric illumination system. In addition, the reflective light valve 220 comprises a digital mirror device (DMD) or a liquid crystal on silicon (LCOS) panel. In the present embodiment, the exemplary reflective light valve 220 is a DMD.

The light beam 214 provided by the light source 212 passes the color wheel 216, the light integration rod 217, the mirror set 218 and the total internal reflection prism (TIR prism) 219 sequentially. The TIR prism 219 reflects the light beam 214 to the reflective light valve 220. At this moment, the reflective light valve 220 converts the light beam 214 into a plurality of sub-images 214a. The sub-images 214a pass through the TIR prism 219, the first vibration mechanism 242 and the second vibration mechanism 244 sequentially, an then are projected on the screen 400 via the projection lens 230.

When the sub-images 214a are incident to the first vibration mechanism 242, the first vibration mechanism 242 changes the transmission path of some of the sub-images 214a in each frame time. In other words, the first vibration mechanism 242 shifts the imaging position of the sub-images 214a passing during some time of the same frame time on the screen 400 by, for example, a distance d1 leftward along the horizontal direction (X-axis). The distance d1 can be, for example but not limited to, a length of ½ pixel. In addition, when the sub-image 214a is incident to the second vibration mechanism 244, the second vibration mechanism 244 also changes the transmission path of a portion of the sub-images 214a in each frame time. In other words, second vibration mechanism 244 shifts the imaging position of the sub-images 214a passing during some time of the same frame time on the screen 400 by, for example, a distance d2 upward along the vertical direction (Z-axis). The distance d2 can be, for example but not limited to, a length of ½ pixel.

Figure 4A:
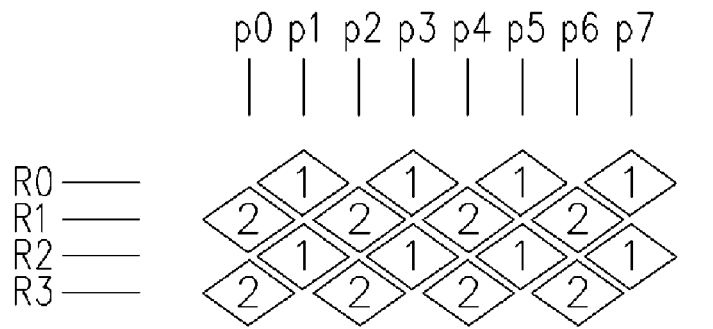
FIGS. 4A to FIG. 4C illustrate schematic views of images projected by a projection device according to one embodiment of the present invention.
Figure 4B:
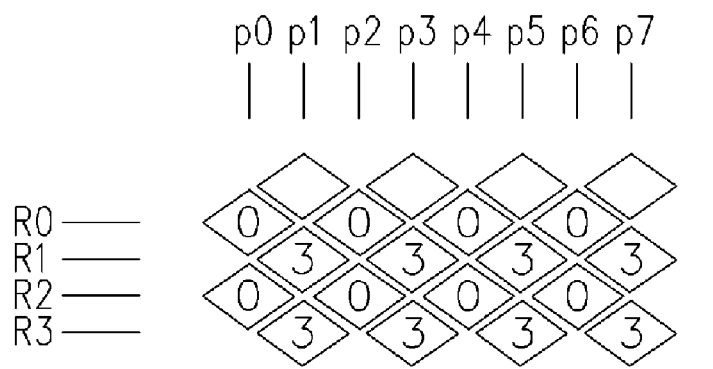
Figure 4C:
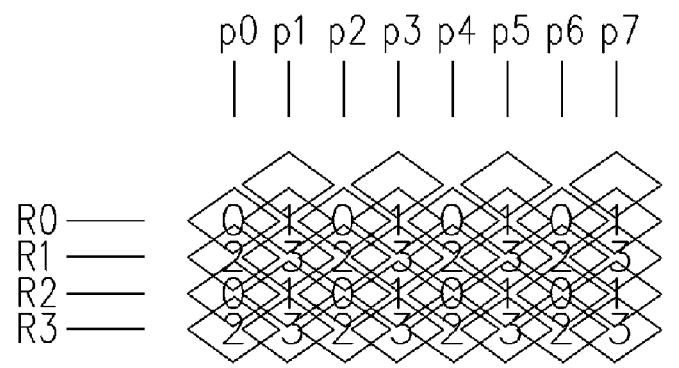

As shown in FIG. 4A, the schematic view of images in which the imaging position of the sub-images 214a is not shifted is illustrated. Thereafter, referring to FIG. 4B, the schematic view of images in which the imaging position of the sub-images 214a is shifted upward by a length of ½ pixel along vertical direction (Z-axis) by the second vibration mechanism 244 is shown. Thereafter, please refer to FIG. 4C. Since the images shown in FIG. 4A and FIG. 4B are different sub-images 214a projected in the same frame time, these sub-images 214a shown in FIG. 4A and FIG. 4B are combined to form the image 216. Therefore, for example, if the resolution of the sub-images 214a shown in FIG. 4A and FIG. 4B are 640×720, the resolution of the image 216 shown in FIG. 4C is enhanced to 1280×720.

As described above, the formed image 216 is twice the row resolution of the sub-images 214a since a portion of the sub-images 214a is shifted upward by ½ pixel along the vertical direction (Z-axis) by the second vibration mechanism 244 at the same frame time. Therefore, if a portion of the sub-images 214a is shifted leftward by ½ pixel along the horizontal direction (X-axis) by the first vibration mechanism 242 at the same frame time, the formed image (not shown) is twice the column resolution of the sub-images 214a. Therefore, if the resolution of the sub-images 214a are 640×720, the resolution of the formed image (not shown) is enhanced to 1280×1440. In other words, in the present embodiment, the reflective light valve 220 with resolution 640×720 (as shown in FIG. 2) is enough to project an image with resolution 1280×1440.

It should be noted that, the first vibration mechanism 242 shown in FIG. 3 is disposed before the second vibration mechanism 244. However, in another embodiment of the present invention, the first vibration mechanism 242 is disposed after the second vibration mechanism 244. In one embodiment of the present invention, the structures of the first vibration mechanism 242 and the second vibration mechanism 244 are similar or the same. Hereinafter, the vibration mechanism will be described in detail.

Figure 5:
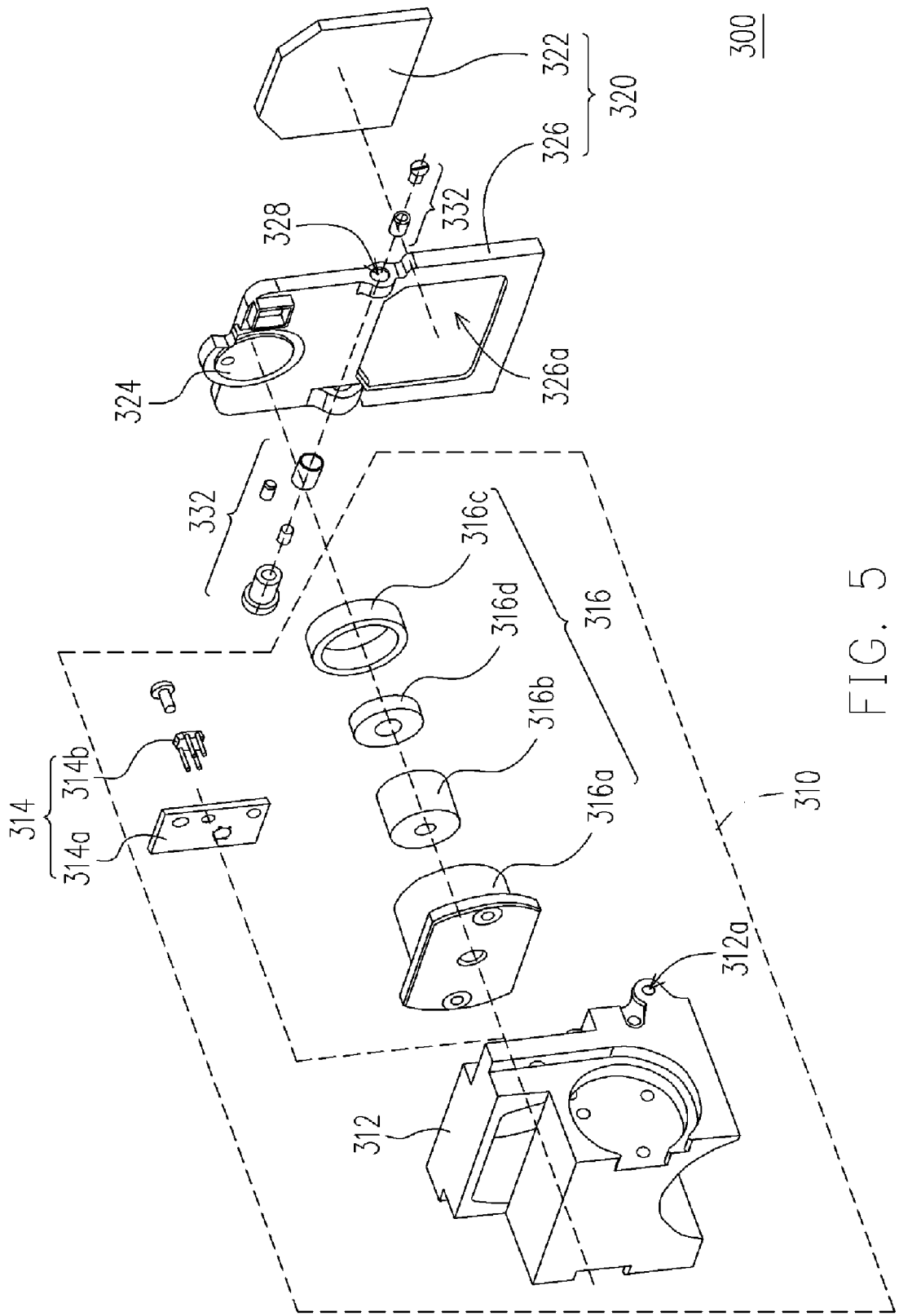
FIG. 5 illustrates an exploded diagram of a structure of a vibration mechanism according to one embodiment of the present invention.

Referring to FIG. 5, the vibration mechanism 300 comprises a fixed component 310 and a vibrating component 320. The vibrating component 320 is connected to the fixed component 310, and the fixed component 310 controls the vibrating component 320 to vibrate within a specific angle θ (not shown). The vibrating component 320 comprises an optical component part 322 disposed on the transmission path of the sub-images 142a as shown in FIG. 2. When the vibrated component 320 vibrates within the specific angle θ, the optical component part 322 shifts the imaging position of the sub-images 142a upward by a distance along an axis. In other words, the optical component part 242a of the first vibration mechanism 242 (as shown in FIG. 3) can shift the imaging position of the sub-images 142a in a horizontal direction (X-axis) by a distance. In addition, the optical component part 244a of the second vibration mechanism 244 (as shown in FIG. 3) can shift the imaging position of the sub-images 142a in vertical direction (Z-axis) by a distance.

The fixed component 310 of the vibration mechanism 300 comprises a holder 312, a sensor module 314 and a coil module 316. The vibrating component 320 is connected to the holder 312 via, for example but not limited to, the connection component 332 and the holes 328 and 312a. In addition, the sensor module 314 is disposed over the holder 312, and the coil module 316 is disposed over the holder 312. The sensor module 314 controls the vibrating component 320 to vibrate within the specific angle θ through the coil module 316. Further, the vibrating component 320 comprises a magnetic material part 324. Thus, the sensor module 314 controls the vibrated component 320 to vibrate within the specific angle θ by changing the magnetism of the coil module 316 such that an attractive force and/or repulsive force are generated between the coil module 316 and the magnetic material part 324. Therefore, the imaging position of the sub-images 142a is changed.

In one embodiment of the present invention, the sensor module 314 comprises a circuit board 314a and a sensor 314b. The circuit board 314a is disposed over the holder 312, and the sensor 314b is disposed over the circuit board 314a. The sensor 314b senses the magnetic material part 324 of the vibrating component 320. When the distance between the magnetic material part 324 and the sensor 314b is less than a specific distance, the circuit board 314a changes the magnetism of the coil module 316 to generate a repulsive force between the coil module 316 and the magnetic material part 324. Therefore, the magnetic material part 324 is repelled away from the sensor 314b. However, when the distance between the magnetic material part 324 and the sensor 314b is larger than a specific distance, the circuit board 314a changes the magnetism of the coil module 316 to generate an attractive force between the coil module 316 and the magnetic material part 324. Therefore, the magnetic material part 324 is attracted to the sensor 314b. Accordingly, by controlling the magnetic material part 324 to move towards and/or away from the sensor 314b, the vibrating component 320 vibrates within the specific angle θ. Thus, the imaging position of the sub-images 142 is shifted.

the coil module 316 of the vibration mechanism 300 comprises a barrel 316a, a magnet 316b and a coil 316c. The magnet 316b is disposed in the barrel 316a, and the coil 316c is also disposed in the barrel 316a. The magnet 316b is disposed through the coil 316c. The circuit board 314a changes the magnetism of the coil module 316 by changing the current direction of the change coil 316c. In addition, the coil module 316 further comprises a permeability component 316d disposed in the barrel 316a, and the magnet 316b is disposed between the bottom of the barrel 316a and the permeability component 316d. The permeability component 316d enhances the magnetism of the coil module 316 to increase the vibration frequency of the vibrating component 320.

It is noted that, in FIG. 5, the mainframe 326 and the optical component part 322 of the vibrating component 320 are manufactured separately, then the optical component part 322 is mounted in the opening 326a of the mainframe 326. However, in another embodiment of the present invention, the mainframe 326 and the optical component part 322 may be a single piece, for example, when the vibrating component 320 is made as a whole in an injection molding method. In addition, the optical component part 320 may comprise a reflection sheet or a lens.

Figure 6:
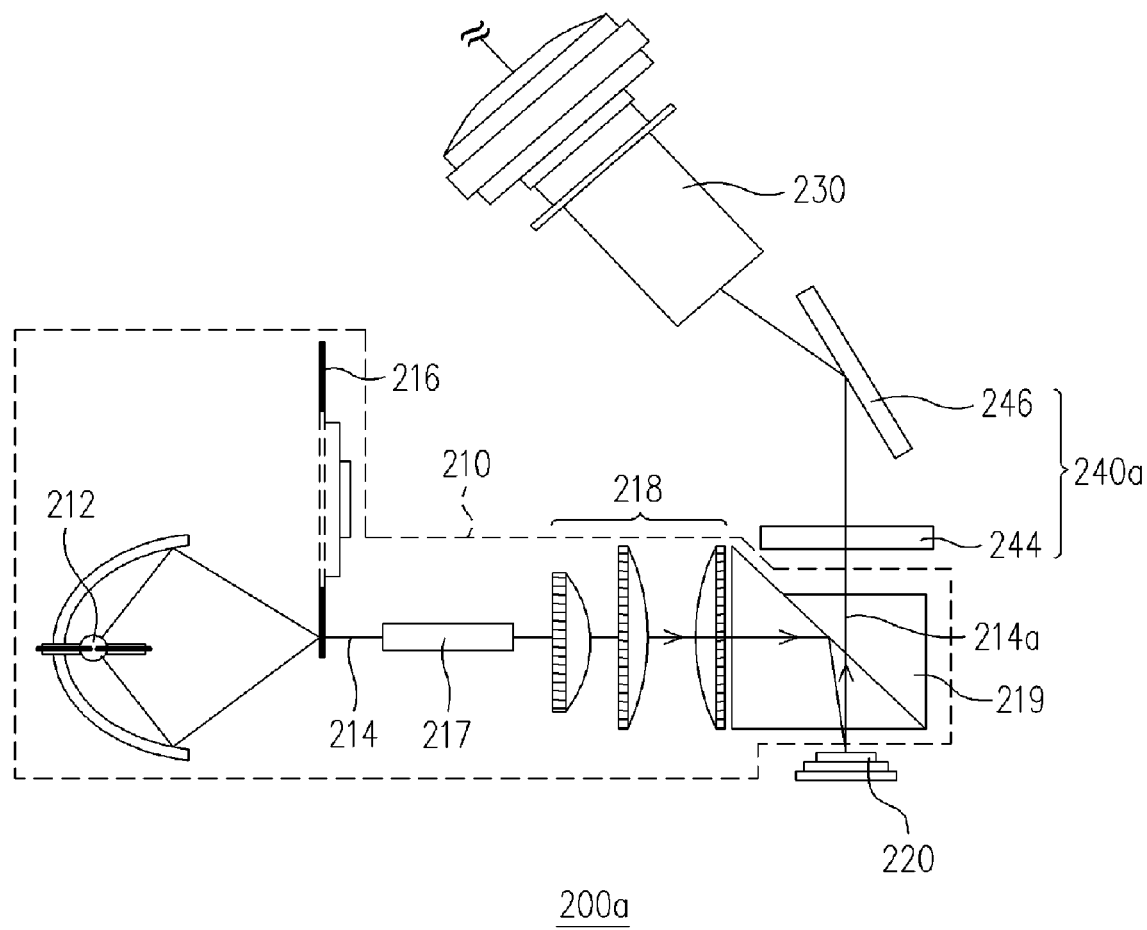
FIG. 6 illustrates a schematic view of a structure of an optical projection device according to another embodiment of the present invention.

Referring to FIG. 6, the optical component part (not shown) of the first vibration mechanism 246 is a reflection sheet, and the optical component part (not shown) of the second vibration mechanism 244 is a lens. In addition, in the image shifting module 200a, the first vibration mechanism 246 is disposed after the second vibration mechanism 244.

It should be noted that, in the present embodiment, the image shifting module is not limited to the forms shown in FIG. 2 and FIG. 6. In another embodiment of the present invention, the optical component part of the first and the second vibration mechanism of the image shifting module may both be reflection sheets. Or, the optical component part of the first vibration mechanism is a lens, and the optical component part of the second vibration mechanism is a reflection sheet.

Accordingly, in the optical projection device of the present invention, an image shifting module is disposed on the transmission path of the sub-images. Therefore, the sub-images are shifted by a desired distance in a horizontal direction in each frame time by a vibration mechanism of the image shifting module to increase the vertical resolution of the image. In addition, the sub-images are shifted by another desired distance in a vertical direction in each frame time by another vibration mechanism of the image shifting module to increase the horizontal resolution of the image. Therefore, the optical projection device of the present invention can project an image having higher resolution than that of the reflective light valve by using the image shifting module.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. It is intended that the scope of the invention be defined by the claims appended hereto and their equivalents in which all terms are meant in their broadest reasonable sense unless otherwise indicated.

What is claimed is:

1. An image shifting module of a projection device for shifting each imaging position of a plurality of sub-images respectively in each frame time, the image shifting module comprising:
a first vibration mechanism disposed on a transmission path of the sub-images, the first vibration mechanism shifting the imaging position of the sub-images along a horizontal direction by a first distance in each frame time; and
a second vibration mechanism disposed on the transmission path of the sub-images, the second vibration mechanism shifting the imaging position of the sub-images along a vertical direction by a second distance in each frame time.

2. The image shifting module of claim 1, wherein the first vibration mechanism is disposed before or after the second vibration mechanism with respect to the transmission path of the sub-images.

3. The image shifting module of claim 1, wherein the first distance comprises a length of ½ pixel.

4. The image shifting module of claim 1, wherein the second distance comprises a length of ½pixel.

5. The image shifting module of claim 1, wherein the first vibration mechanism comprises:
a first fixed component; and
a first vibrating component connected to the first fixed component for controlling the first vibrating component to vibrate within a first angle,
wherein the first vibrating component comprises a first optical component part disposed on the transmission path of the sub-images, and the first optical component part shifts the imaging position of the sub-images along the horizontal direction when the first vibrating component vibrates within the first angle.

6. The image shifting module of claim 5, wherein the first fixed component comprises:
a first holder;
a first coil module disposed over the first holder; and
a first sensor module disposed over the first holder for controlling the first vibrating component to vibrate within the first angle through the first coil module.

7. The image shifting module of claim 6, wherein the first vibrating component comprises a first magnetic material part, and the first sensor module changes a magnetism of the first coil module such that an attractive force and/or a repulsive force are generated between the first coil module and the first magnetic material part to control the first vibrating component to vibrate within the first angle.

8. The image shifting module of claim 6, wherein the first sensor module comprises:
a first circuit board disposed over the first holder; and
a first sensor disposed over the first circuit board.

9. The image shifting module of claim 6, wherein the first coil module comprises:
a first barrel;
a first magnet disposed in the first barrel; and
a first coil disposed in the first barrel, wherein the first magnet is disposed through the first coil.

10. The image shifting module of claim 9, wherein the first coil module further comprises a first permeability component disposed in the first barrel, and the first magnet is disposed between a bottom of the first barrel and the first permeability component.

11. The image shifting module of claim 5, wherein the first optical component part comprises a reflection sheet or a lens.

12. The image shifting module of claim 1, wherein the second vibration mechanism comprises:
a second fixed component; and
a second vibrating component connected to the second fixed component for controlling the second vibrating component to vibrate within a second angle,
wherein the second vibrating component comprises a second optical component part disposed on the transmission path of the sub-images, and the second optical component part shifts the imaging position of the sub-images along the vertical direction when the second vibrating component vibrates within the second angle.

13. The image shifting module of claim 12, wherein the second fixed component comprises:
a second holder;
a second coil module disposed over the second holder; and
a second sensor module disposed over the second holder for controlling the second vibrating component to vibrate within the second angle through the second coil module.

14. The image shifting module of claim 13, wherein the second vibrating component comprise a second magnetic material part, and the second sensor module changes a magnetism of the second coil module such that an attractive force and/or a repulsive force are generated between the second coil module and the second magnetic material part to control the second vibrating component to vibrate within the second angle.

15. The image shifting module of claim 13, wherein the second sensor module comprises:
a second circuit board disposed over the second holder; and
a second sensor disposed over the second circuit board.

16. The image shifting module of claim 13, wherein the second coil module comprises:
a second barrel;
a second magnet disposed in the second barrel; and
a second coil disposed in the second barrel, wherein the second magnet is disposed through the second coil.

17. The image shifting module of claim 16, wherein the second coil module further comprises a second permeability component disposed in the second barrel, and the second magnet is disposed between a bottom of the second barrel and the second permeability component.

18. The image shifting module of claim 12, wherein the second optical component part comprises a reflection sheet or a lens.

19. An optical projection device, comprising:
an illumination system for providing a light beam;
a reflective light valve disposed on a transmission path of the light beam, wherein the reflective light valve converts the light beam into a plurality of sub-images in each frame time;
a projection lens disposed on the transmission path of the sub-images, the reflective light valve being disposed between the illumination system and the projection lens; and
an image shifting module disposed on the transmission path of the sub-images and between the reflective light valve and the projection lens, wherein the image shifting module shifts an imaging position of each of the sub-images in each frame time, the image shifting module comprising:

a first vibration mechanism disposed on a transmission path of the sub-images, the first vibration mechanism shifting the imaging position of the sub-images along a horizontal direction by a first distance in each frame time; and a second vibration mechanism disposed on the transmission path of the sub-images, the second vibration mechanism shifting the imaging position of the sub-images along a vertical direction by a second distance in each frame time.

20. The optical projection device of claim 19, wherein the illumination system comprises a telecentric illumination system or a non-telecentric illumination system.

* * * * *